United States Patent [19]

Gaines

[11] 4,301,384
[45] Nov. 17, 1981

[54] END SUPPORT FOR SUPERCONDUCTING MAGNET

[75] Inventor: Albert L. Gaines, West Simsbury, Conn.

[73] Assignee: Combustion Engineering, Inc., Windsor, Conn.

[21] Appl. No.: 79,623

[22] Filed: Sep. 27, 1979

[51] Int. Cl.$^3$ .......................................... H02K 44/00
[52] U.S. Cl. ..................................... 310/11; 335/216
[58] Field of Search ..................... 310/11, 10; 335/216

[56] References Cited

U.S. PATENT DOCUMENTS

| | | | |
|---|---|---|---|
| 3,215,870 | 11/1965 | Brill | 310/11 |
| 3,239,697 | 3/1966 | Stekly | 310/11 |
| 3,626,341 | 12/1971 | Dao | 335/216 |

*Primary Examiner*—Donovan F. Duggan
*Attorney, Agent, or Firm*—William W. Habelt

[57] ABSTRACT

A superconducting magnet assembly (10) suitable for use as a magnetohydrodynamic generator having an elongated channel (12) through which a high temperature, high ionized gas may be passed while immersed in a high strength magnetic field produced therein by a plurality of elongated saddle-shaped superconducting magnet rings (16) disposed side-by-side in planes parallel to the longitudinal axis of the channel as symmetrical pairs with the end turns of each of the rings outwardly directed. A compression member end support (30), preferably wedge-shaped, is disposed between the end turns of the symmetrical pairs of saddle-shaped superconducting magnet rings (16) so as to absorb the attractive forces generated between the end turns.

1 Claim, 3 Drawing Figures

END SUPPORT FOR SUPERCONDUCTING MAGNET

BACKGROUND OF THE INVENTION

This invention relates to superconducting magnets and, more particularly, to a superconducting magnet assembly suitable for use as a magnetohydrodynamic generator having a wedge-shaped compressor member end support.

Magnetohydrodynamics (MHD) is a method of generating power by directly converting fuel energy into electrical energy. In a MHD generator, fuel is combusted so as to produce a very high temperature, high pressure ionized gas commonly termed plasma. The plasma generated in the MHD burner is passed through a channel immersed in a high strength magnetic field generated by a plurality of superconducting magnets flanking the channel. The plasma passing therethrough induces an electrical current which is gathered in electrodes lining the channel.

Because of the high efficiency associated with a direct conversion mechanism of MHD, major development efforts are underway to produce commercial scale MHD generators. One problem encountered in designing the commercial MHD generators is providing a superstructure for supporting and enclosing the superconducting magnets which are capable of withstanding the high stresses created when the superconducting magnets are energized.

The superconducting magnet of a MHD generator typically comprises a magnet substructure of a plurality of elongated symmetrical magnet pairs flanking the channel through which the plasma passes. One magnet of each symmetrical pair is disposed on one side of the channel, and its corresponding counterpart is disposed on the other side of the channel. When energized, the magnets want to deform into a circular shape. That is, the long sides of the individual magnets repel each other in inverse proportion to the square of the distance between conductors in which current directions are opposite. Likewise, there is an attraction between conductors in which current directions are in the same direction, causing the pairs of magnets to be attracted in inverse proportion to the square of the distance between conductors. Thus, a conductor forming a magnet if unrestrained will deform into a circle so as to equalize the repulsive and attractive forces on the conductor.

As a result, the superstructure for encircling and supporting the superconducting magnet substructure must effectively absorb and equilibrate the stresses generated when the magnets are energized. An improved superstructure for enclosing and supporting a superconducting magnet assembly which effectively absorbs and equilibrates the repulsive magnetic forces generated within the superconducting magnet assembly is disclosed and claimed in a related application of even date of Shotwell and Gaines entitled, "Superconducting Magnet Assembly".

In accordance with said related application, a magnet substructure is provided for producing the high strength magnetic field within the channel through which the high temperature, high pressure ionized gas is to pass, the magnet substructure having a first magnetic pole disposed above the channel and a second magnetic pole, opposite in polarity to the first magnetic pole, disposed below the channel. The outer surfaces of the first and second magnetic poles are machined to conform to a pre-calculated catenary-shaped curve. A support superstructure for absorbing the equilibrating repulsive magnetic forces generated within the magnet substructure when the first and second magnetic poles are energized completely encloses the magnet substructure. The inner surface of the superstructure is also machined to conform to the pre-calculated catenary-shaped curve so as to mate with the outer surfaces of the first and second magnetic poles. Because of the catenary shape of the interface, the load carried by the support superstructure members will not create a bending moment but will be in pure tension and will efficiently equilibrate the repulsive forces generated within the magnet substructure. The Shotwell and Gaines application does not, however, address the problem of absorbing and equilibrating the attractive magnetic forces generated within the magnet substructure.

SUMMARY OF THE INVENTION

The present invention provides an improved superconducting magnet assembly wherein the attraction forces generated within the superconducting magnet are effectively absorbed and equilibrated.

In accordance with the present invention, a compression member end support, preferably wedge shaped, is disposed coaxially about the MHD channel at each end of the magnet substructure between the outwardly extending end turns of the symmetrical layers of the magnet subassembly formed by the individual superconducting magnet rings. The compression member end support serves to absorb the stresses arising due to the attraction of the end turns of the individual magnets to each other and transmit this stress to the channel which also serves as an axial load carrying member.

BRIEF DESCRIPTION OF THE PREFERRED EMBODIMENT

Figure 1:
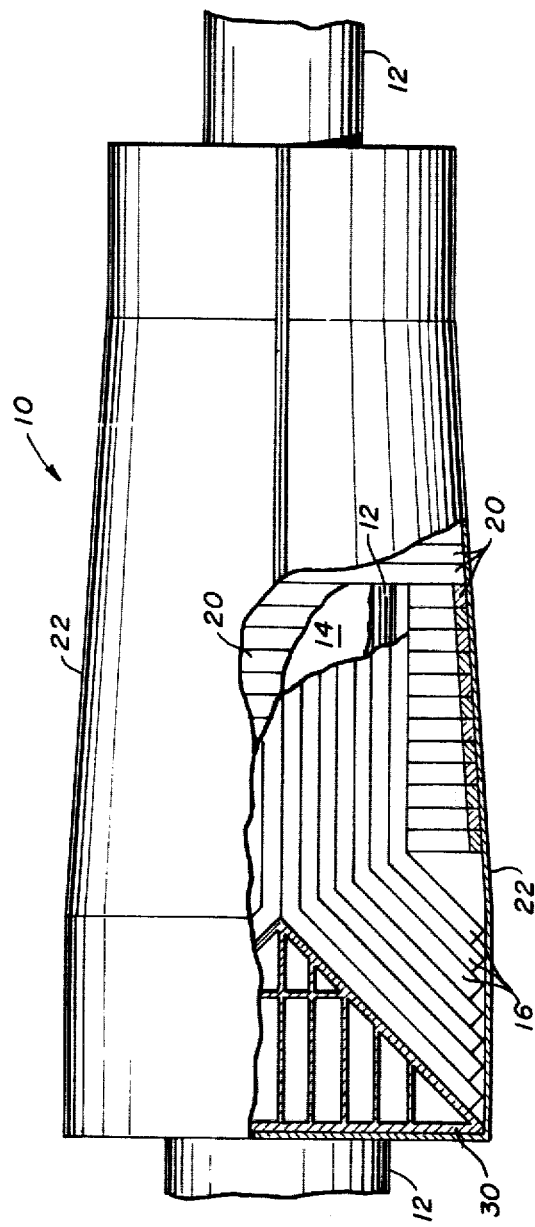
FIG. 1 is a top view, partly in section, looking down upon a superconducting magnet assembly constructed in accordance with the present invention.

Referring now to the drawing, and more particularly to FIG. 1 thereof, there is depicted a superconducting magnet assembly 10 suitable for use as a magnetohydrodynamic generator and constructed in accordance with the teachings of the present invention. Generally, the superconducting magnet assembly 10 comprises a channel 12, often but not necessarily tubular as illustrated, defining a flow passage 14 through which a high temperature, high pressure ionized fluid commonly termed plasma may be passed while immersed in a high strength magnetic field established within the channel 12. A magnetic substructure consisting of a plurality of individual superconducting magnets 16 in the form of elongated, outwardly concave saddle-shaped rings are disposed in parallel planes along the longitudinal axis of the channel as symmetrical pairs, one on one side of and the other at an equal distance to the opposite side of the longitudinal axis of the channel 12. In this manner, the upper halves of the individual superconducting magnets 16 are stacked in pancake-like fashion so as to form a first magnetic pole disposed above the channel 12; and the lower length of the individual conducting magnets 16 are similarly stacked in an axisymmetric layer to form a second magnetic pole disposed below the channel 12, said poles being of opposite polarity. Enclosure loops 20 provide a superstructure for supporting the magnet substructure and prevent the lateral lengths of the individual saddle-shaped superconducting magnet rings 16 from deforming when energized. The pressure containment shell 22 having end openings through which the channel 12 penetrates completely encloses the superconducting magnet assembly.

Figure 2:
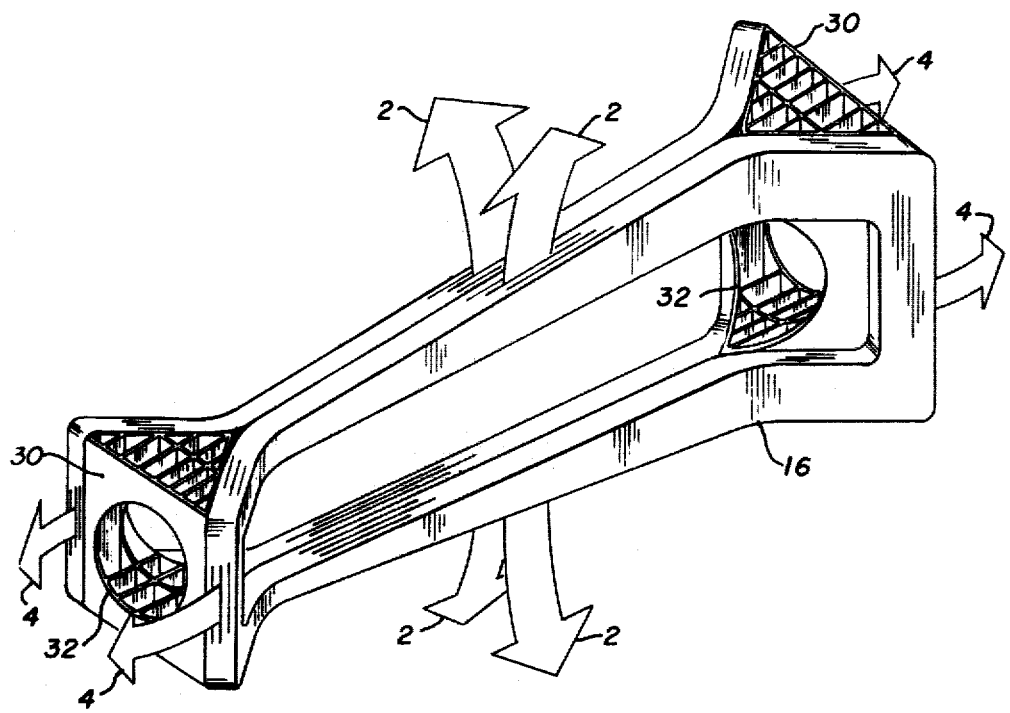
FIG. 2 is a perspective view showing the compression edge end support of the present invention and illustrating the forces generated when the superconducting magnets are energized.

As mentioned previously, when the individual superconducting magnets 16 are energized, they tend to warp out of shape by deforming from elongated saddle-shaped rings into a planar circle under pressure of the repulsive forces to and the attractive forces for as illustrated in FIG. 2. In accordance with the present invention, a wedge-shaped end support 30 is disposed coaxially about the channel 12 at each end of the magnet substructure between the outwardly extending end turns of the symmetrical layers formed by the individual superconducting magnet rings 16 as best shown in FIGS. 2 and 3.

When energized, the outwardly directed end turns of the individual superconducting magnet rings 16 of the symmetric layers will be attracted to each other and press inward upon the wedge-shaped end support 30 which, as a result, will be placed in compression. The wedge-shaped compression member end support 30 serves to absorb the attractive forces generated between the end turns of the magnet subassembly and to transmit these forces to channel 12 which is designed to serve as an axial load carrying member.

Figure 3:
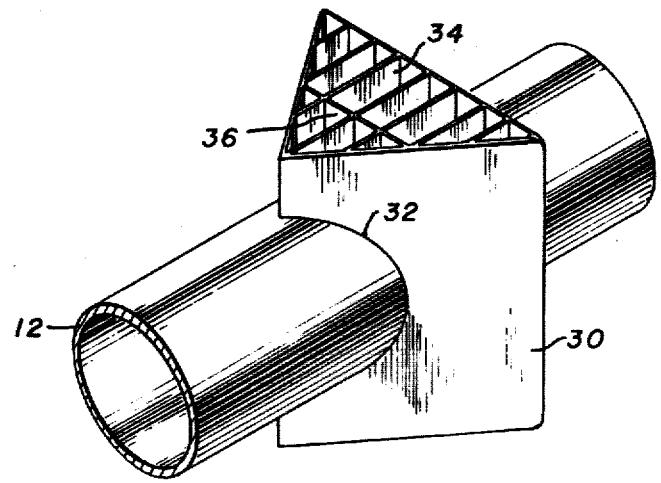
FIG. 3 is an enlarged perspective view showing the compression wedge end support of the present invention.

As best shown in FIG. 3, the wedge-shaped compression member end support 30 has a hole 32 passing therethrough so as to permit the end support to be disposed coaxially about the channel 12. Although the wedge-shaped end support 30 could be constructed of solid nonmagnetic material, it is preferred in order to minimize material mass that the wedge-shaped end support 30 comprise a hollow right prism having an internal support frame structure such as, but not limited to, that shown in FIG. 3 wherein a plurality of longitudinal support blades 34 and a plurality of cross support plates 36 disposed between the longitudinal support blades 34 form the internal support frame.

It may, therefore, be seen that the present invention provides an improved superconducting magnet assembly wherein the attractive magnetic forces generated within the magnet substructure are absorbed by a compression member in the form of a wedge-shaped end support disposed between the outwardly directed end turns of the superconducting magnets.

I claim:

1. An improved superconducting magnet assembly suitable for use as a magnetohydrodynamic generator having an elongated channel defining a flow passage through which a high temperature, high pressure ionized gas may be passed while immersed in a high strength magnetic field produced therein, and a plurality of elongated saddle-shaped superconducting magnet rings disposed side-by-side in planes parallel to the longitudinal axis of said channel as symmetrical pairs with the end turns of each of said rings outwardly directed; the improvement comprising:

a wedge-shaped compression member disposed coaxially about said channel between the outwardly directed end turns of said symmetrical pairs so as to absorb the attractive forces generated between the end turns and transmit the absorbed forces to channel, said channel comprising an axial-load carrying member.

* * * * *